United States Patent

Lee et al.

[11] Patent Number: 6,096,287
[45] Date of Patent: Aug. 1, 2000

[54] PROCESS FOR PREPARING MESOPOROUS CRYSTALLINE MATERIAL

[75] Inventors: Jung Min Lee; Soon Yong Jeong; Jeong Kwon Suh; Hang Kyo Jin; Oh Yun Kwon, all of Daejeon, Rep. of Korea

[73] Assignee: Korea Research Institute of Chemical Technology, Rep. of Korea

[21] Appl. No.: 09/051,832

[22] PCT Filed: Jul. 26, 1996

[86] PCT No.: PCT/KR96/00120

§ 371 Date: Jan. 14, 1999

§ 102(e) Date: Jan. 14, 1999

[87] PCT Pub. No.: WO97/16374

PCT Pub. Date: May 9, 1997

[30] Foreign Application Priority Data

Oct. 31, 1995 [KR] Rep. of Korea ............... 95-38384

[51] Int. Cl.[7] ................ C01B 33/12; C01B 33/20; C01B 39/00

[52] U.S. Cl. ................ 423/702; 423/705; 423/326; 423/328.2; 423/335

[58] Field of Search ................ 423/702, 705, 423/326, 328.2, 335

[56] References Cited

U.S. PATENT DOCUMENTS

| 5,057,296 | 10/1991 | Beck | 423/277 |
|---|---|---|---|
| 5,098,684 | 3/1992 | Kresge et al. | 423/277 |
| 5,102,643 | 4/1992 | Kresge et al. | |
| 5,108,725 | 4/1992 | Beck et al. | 423/263 |
| 5,112,589 | 5/1992 | Johnson et al. | |
| 5,221,648 | 6/1993 | Wachter | 502/68 |
| 5,593,655 | 1/1997 | Jongkind et al. | 423/702 |
| 5,595,715 | 1/1997 | Roth | 423/328.1 |

FOREIGN PATENT DOCUMENTS

0 162 554  11/1985  European Pat. Off. .

*Primary Examiner*—Mark L. Bell
*Assistant Examiner*—David Sample
*Attorney, Agent, or Firm*—Finnegan, Henderson, Farabow, Garrett & Dunner

[57] ABSTRACT

The present invention relates to a process for preparing mesoporous crystalline material, in particular to a novel process for preparing crystalline material having mesoporous structure by dissolving silica in hydrogen fluoride solution and reacting it on the condition of atmosphere and room temperature for a short reaction time. As the result, the present invention provides a process to use all kinds of silica and to synthesize mesoporous material for a short reaction time.

5 Claims, 6 Drawing Sheets

PROCESS FOR PREPARING MESOPOROUS CRYSTALLINE MATERIAL

BACKGROUND OF THE INVENTION

1. Field of the Invention

The present invention relates to a process for preparing mesoporous crystalline material, in particular to a novel process for preparing crystalline material having mesoporous structure by dissolving silica in hydrogen fluoride solution and reacting it on the condition of atmosphere and room temperature for a short reaction time.

As the result, the present invention provides a process to use all kinds of silica and to synthesize mesoporous crystalline material for a short reaction time.

2. Description of the Prior Art

Porous inorganic materials have found great utility as catalysts or separation media for industrial application. The opening of their microstructure allows molecules to access to the relatively large surface areas of these materials that enhance their catalytic and sorptive activity when reaction occurs.

The porous materials in use today can be sorted into the broad categories using the details of their microstructure as a basis for classification. These categories are the amorphous support, crystalline molecular sieves and modified layered structures to intercalate small fragments like metal oxide.

The microstructure of these materials shows the detailed differences and due to said differences, their specific selectivity is manifested in the catalytic and sorptive behavior. Further, the above differences are ascertained in terms of their surface area, the size of pores and the variability in those size and X-ray diffraction patterns. The microstructure appearance of the materials is also shown through transmission electron microscopy.

Generally since amorphous silica or alumina support forms the pore resulting from voids between particles, they don't have uniform pore size and show the pore size of wide range of 13~200 Å.

In contrast to these structurely ill-defined materials, the solids of regular crystallinity like zeolite have very narrow pore size distribution. The majority of natural or synthetic zeolites have the pore of limited size and mesoporous zeolites having uniform distribution of ZSM series were synthesized in an effort to enlarge the pore size.

In addition, for using the layered silica and metal phosphate compounds including natural or synthetic clays, the synthesis of fine porous materials was attempted. The pore size distribution is regular compared to amorphous support but irregular compared to crystalline support like zeolite.

Recently, novel mesoporous crystalline materials were successfully synthesized by Mobil Co. Their pore size can be controlled uniformly in the regime of 20~100 Å. It was named as MCM-41 and U.S. Pat. Nos. 5,108,725; 5,102,643; 5,098,684 and 5,057,296 describe synthesizing process, reactants for synthesis, composition, physical and structural property.

In the above mentioned prior arts, they demonstrated a synthesizing process for preparing mesoporous crystalline materials by using tetraammonium hydroxides like tetramethyl ammoniumsilicate solution as well as surfactant in an autoclave at a temperature of 100~150° C. for 2~7 days. The reaction principle of this process is attracting silica or silica allumina crystal on the micelle colloid surface having charge, which is formed by dissolution of surfactant molecules in water. Ignition may form a bond and crosslink with the bridge of oxygen between Al and Si in the molecular dimension. To satisfy said circumstance, a large amount of tetraammonium hydroxides is used and reaction condition is controlled at high temperature and high pressure for 2~7 days.

Materials prepared by said process have not only uniform pore size but also remarkable thermal property and large surface area of 500~1000 $m^2/g$.

The constituents of framework consist of $SiO_2$ and $SiO_2/Al_2O_3$. In view of remarkable physical properties, these new materials will replace the conventional zeolites and be widely used in the future.

Silica is hydrolyzed with the form of hydroxide anion in strong aqueous alkali solution and dissolved. Formed silicon hydroxide anions at this very moment make a wall of pores by forming network by means of silicon bonding because polymerization occurs on the micelle colloid surface having positive charge if miscelle colloid of cationic surfactant exits.

Generally the solubility of silica largely depends on the kind of alkali, particle size of silica, density, temperature and pressure. Alkali-metal hydroxides are largely used in synthesizing of crystalline silicate but its use is not preferred because a large amount of impurities such as salts ($Na_2SO_4$, NaCl) can be deposited during the neutralization process when used in synthesis of MCM-41.

If bulk density of silica is sufficiently low and particle size is sufficiently small, the large quantity of silica may be dissolved comparatively in the organic base such as tetramethyl ammonium hydroxides. But these procedures have disadvantages that the kind of usable silica is limited and particular conditions of high temperature, high pressure and long of time are required.

Moreover, tetramethyl amonium hydroxides is expensive and decomposes to amine and alcohol at high temperature and it is technically and economically difficult to manufacture and operate reaction apparatus of high temperature and pressure.

In said process, a large amount of tetra ammonium hydroxides of high price are used and it is not economical. And there are additional disadvantages in the process in that the reaction ought to be carried out at high temperature and high pressure for a long time as the well as disadvantage that only raw material of silica, for example highsil, ultrasil or fumed silica, which are voluminous and easy to fly is used to facilitate dissolution.

Accordingly, in order to solve the above mentioned problems, inventors have made an effort to manufacture more economically and in a short time the crystalline materials having conventional mesoporous structure named MCM-41 by using all kinds of silica. And finally, we have developed a novel process for preparing mesoporous crystalline materials by using hydrogen fluoride solution with all kinds of silica for a few hours at a temperature range of 25~80° C.

SUMMARY OF THE INVENTION

An object of the present invention is to provide a novel process that prepare mesoporous crystalline materials for a short time in the condition of room temperature and atmosphere.

DETAILED DESCRIPTION OF THE INVENTION

The crystalline materials having mesoporous structure of this invention are prepared by the following steps of a) dissolving 2~10 part by weight of silica only or a mixture of metal salts or metal alkoxide in 100 part by weight of 5~50% hydrogen fluoride solution, b) adding said solution to the solution of 2~10 part by weight of cationic surfactant and 20~30 part by weight of conc. ammonia solution in 100 part by weight of distilled water, c) aging at a temperature of 25~80° C. for 2~3 hours, and d) calcining at a temperature of 500~800° C. for 4~6 hours.

The present invention is described in more detail by the following.

The present invention relates to a novel process for preparing mesoporous crystalline materials having uniform pore size and remarkable thermal property.

Through the use of hydrogen fluoride solution as silica solvent, the present invention has advantages that all kinds of silica are used freely as well as that a large amount of silica can be dissolved under room temperature and atmosphere for a short time. Synthetic principle comprises dissolving silica with the form of $H_2SiF_6$ in hydrogen fluoride solution and forming $SiF_6^{2-}$ in alkalic solution of cationic surfactant for a moment and $SiF_6^{2-}$ is crystallized with the form of $SiO_2$ by hydrolysis condensation polymerization on the micelle surface of cationic surfactant. This synthetic steps can be considered as a remarkable improvement of conventional reaction process because it is achieved at room temperature and atmosphere for a short time.

Synthetic process of the present invention is described in more detail by the following.

First, 100 part by weight of hydrogen fluoride solution having 5~50% concentration is sampled and 2~10 part by weight of silica only or the mixture of metal salts and metal alkoxide is dissolved in the above solution. Wherein, if the concentration of hydrogen fluoride solution is less than 5%, the solubility of silica is so low that sufficient amount of silica can't be dissolved, if more than 50%, it has adverse effects of increasing ammonia consumption on the precipitation process as well as wasting hydrogen fluoride solution unnecessarily.

In the present invention, all kinds of available silica can be used without limit of particle size, compared to fine particle used in the conventional process such as highsil, ultrasil and silica used for tetramethyl ammonium silicate. And metal salts can be used such as $Al(NO_3)_3$, $Al(SO_4)_3$, $AlCl_3$ or $NaAlO_2$ and metal alkoxide, such as titanium(IV) alkoxide, aluminium alkoxide or silicon alkoxide. The above mentioned silica mixed with small amount of metal salts or metal alkoxide, or 2~10 part by weight of silica only to 100 part by weight of hydrogen fluoride solution is dissolved, in order to prepare silica-hydrogen fluoride solution($H_2SiF_6$). The more silica component is dissolved, the more it is advantageous.

Apart from the above mentioned process, after 2~10 part by weight of cationic surfactant to 100 part by distilled water is dissolved, and then 20~30 part by weight of conc. ammonia solution is added and stirred. Wherein, alkyltrimethylammonium salts having hydrocarbon chain of more than 10 carbon atom can be used as cationic surfactant. The representing surfactant of them is cetyltrimethylammonium bromide or cetyltrimethylammonium chloride. If the additive quantity of said surfactant is less than 2 part by weight to 100 part by weight of distilled water, the formation of desired micelle template becomes difficult. If more than 10 part by weight, the formation of micelle template of the layered lamella type is possible, which is not sphere or cylinder type. Also, when final product is washed, economic loss and environmental pollution are caused due to a large quantity outflow of remaining surfactant. Said silica dissolved by hydrogen fluoride solution is added to cationic surfactant at a time and stirred, and then is aged at 25~80° C. for 2~3 hrs. When aging temperature deviate the above range, it is not preferred due to complexity in apparatus design and operation management because it is reacted in the autoclave. The aged material is filtered and its precipitate is collected, and then washed. The mesoporous crystalline material of the present invention is prepared by calcining at a temperature of 500~800° C. for 4~6 hrs.

Mesoporous crystalline material prepared in said process has $SiO_2$ structure only or structure replaced Si site by a portion of Al or Ti, wherein the molar ratio of Si/Al or Si/Ti was more than 10.

X-ray powder diffraction data to sample prepared in said process were collected using an automated diffraction system (Rigaku Co., Japan) with Ni-filtered Cu Kα radiation operating at 15 mA and 35 kV. Relative intensity was measured at rotation angle(2θ) of 1.5~20° with the count range of 5000 cps.

And, after nitrogen adsorption isotherms were obtained at liquid nitrogen temperature(77K), the measurement of surface area was calculated by analyzing the value of the adsorption at 5~100 torr of nitrogen through the BET (Brunauer Emmett Teller) formula. Micrometies ASAP 2000 was used as adsorption apparatus. After all the samples were evacuated at vacuum and 300° C. for 4 hrs, $N_2$ adsorption experiment was carried rut. The distribution of pore size was calculated through BJH(Barret Joyner Halenda) formula.

According to X-ray diffraction analysis and surface area measurement, d-spacing is in the the range of 35~45 Å. And it shows the same aspect with MCM-41 of crystalline materials having conventional mesoporous structure and the shape of pore showed regularly hexagonal arrangement like a nest of hornets. The surface area of materials was 800~1000 $m^2$/g and the pore size was distributed at the range of 35~40° intensively.

As the above mentioned description, the synthetic process of the present invention includes various kinds of silica available and the preparation of crystalline materials of mesoporous structure of conventional MCM-41 series having remarkable thermal property and large surface area without using tetraammonium hydroxide.

The following examples serve to illustrate the present invention, such examples are given for the purpose of illustration and not for purposes of limiting the present invention.

EXAMPLE 1

100 g of 24% hydrogen fluoride solution was loaded into the polyethylene beaker and 3 g of silica(White carbon, OCl) was dissolved completely in the solution. 100 g of distilled water was loaded in the another beaker and 4 g of cetyltrimethylammonium bromide was dissolved, and then was stirred vigorously at 50° C. for 10 mins., adding 25 g of conc. aqueous ammonia solution. The prepared silica in hydrogen fluoride solution was added to this solution at a time. The resulting mixture was stirred for 10 mins. carefully, and then was aged at temperature of 30° C. for 2~3 hours. The product was filtered, precipitated and washed several times with distilled water.

Figure 1:
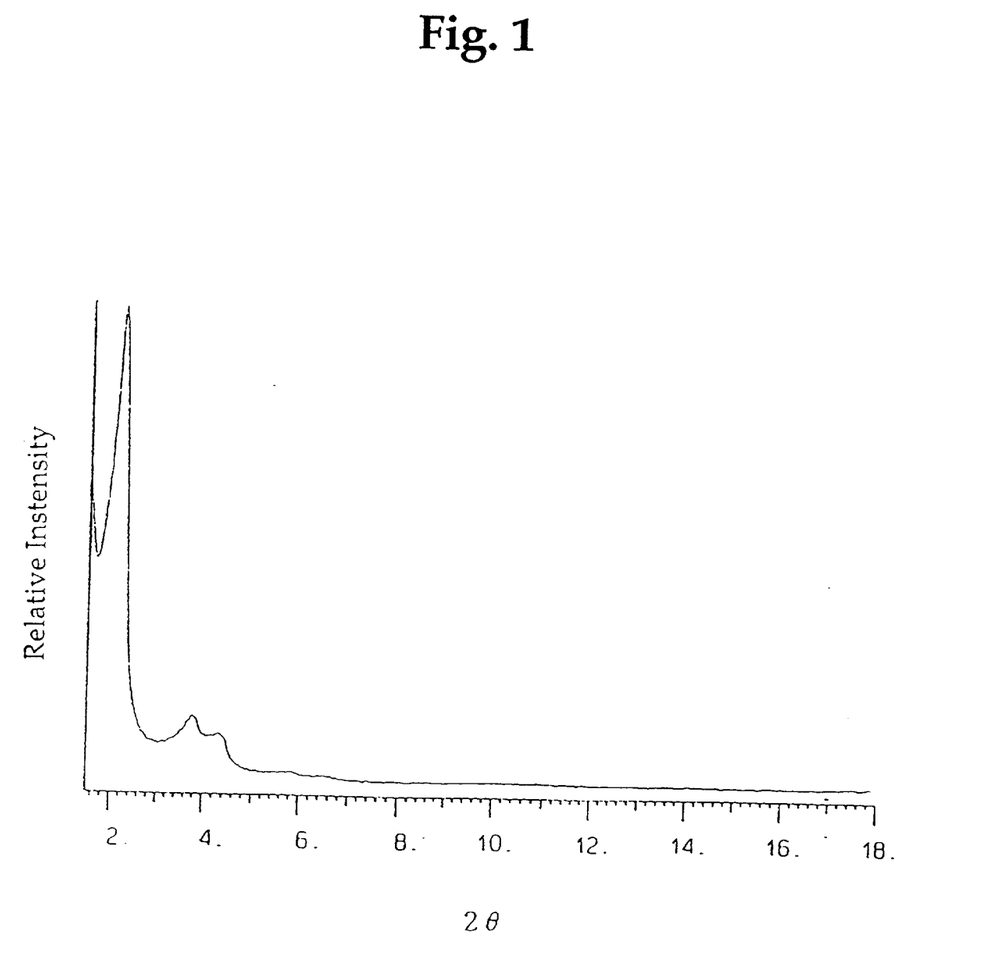
FIG. 1 is a X-ray diffraction pattern diagram of the final product of the present invention from Example 1.

Dried powder was calcined at a temperature of 600° C. for 4 hours. The X-ray diffraction pattern of calcined product was identical with that illustrated in FIG. 1 and showed 40.8° units d-spacing with relatively strong intensity. This pattern has been found to characteristic peak of MCM-41.

The pore observed by transmission electron microscopy (TEM) showed the regularly hexagonal arrangement like nest of hornet. The surface area obtained from BET formula was 880 m$^3$/g and pore size was distributed in the 35 Å intensively.

EXAMPLE 2

Figure 2:
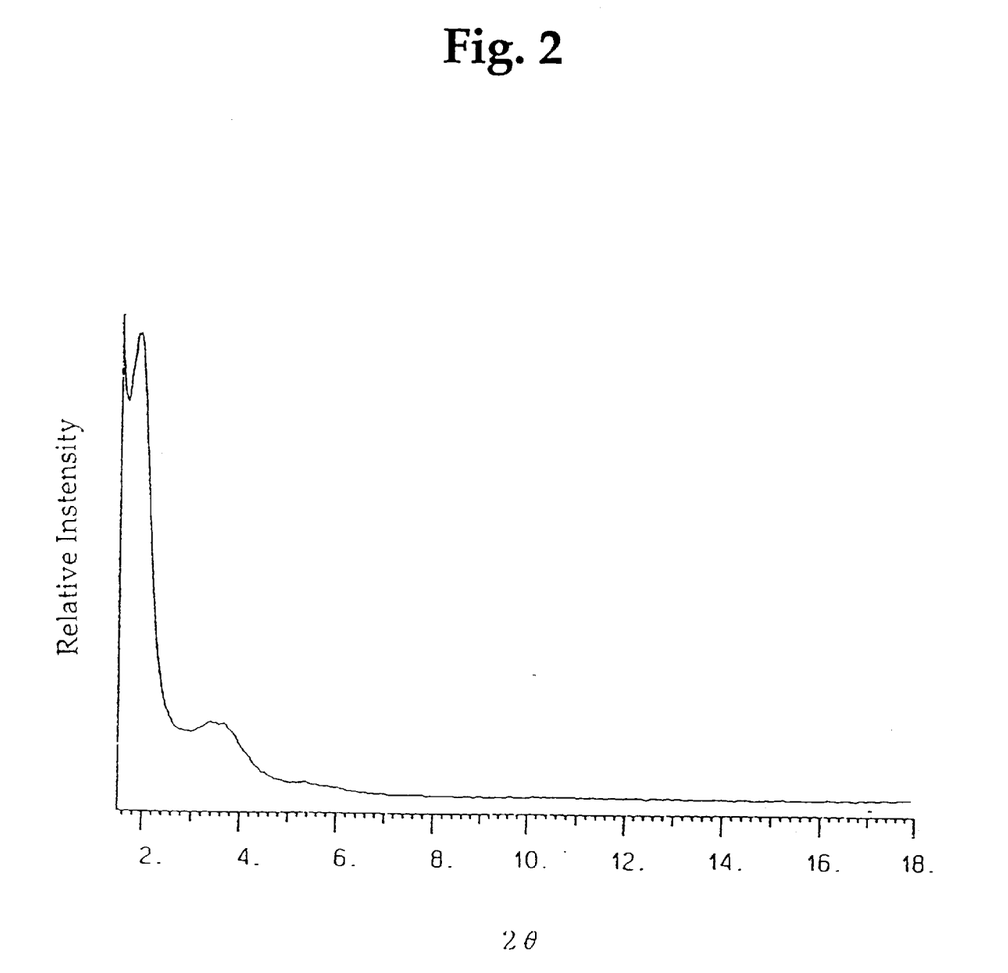
FIG. 2 is a X-ray diffraction pattern diagram of the final product of the present invention from Example 2.

The procedure of this example is similar to that of example 1. The difference resides in the fact that 100 g of 24% hydrogen fluoride solution was loaded in the polyethylene beaker and 3 g of silica was dissolved completely in the solution, and then to this solution is added 0.5 g of $Al(NO_3)_3$ $9H_2O$. The crystal obtained from this example showed structure having Si framework replaced by a portion of Al, wherein the ratio of Si/Al was 40. And the X-ray diffraction pattern of the calcined product of this example was shown in FIG. 2. Characteristic peak of MCM-41 is shown in this figure, and it was noted that relatively strong intensity is 46.8 Å d-spacing. The calcined product of this example proved to have a surface area of 900 m$^2$/g and pore size distribution of 38 Å.

EXAMPLE 3

This example is identical with the above example 2 except using 0.86 g of $Al(SO_4)_3$ $18H_2O$ instead of $Al(NO_3)_3$ $9H_2O$. The crystal obtained from this example showed structure having Si framework replaced by a portion of Al, wherein the molar ratio of Si/Al was 37.

Figure 3:
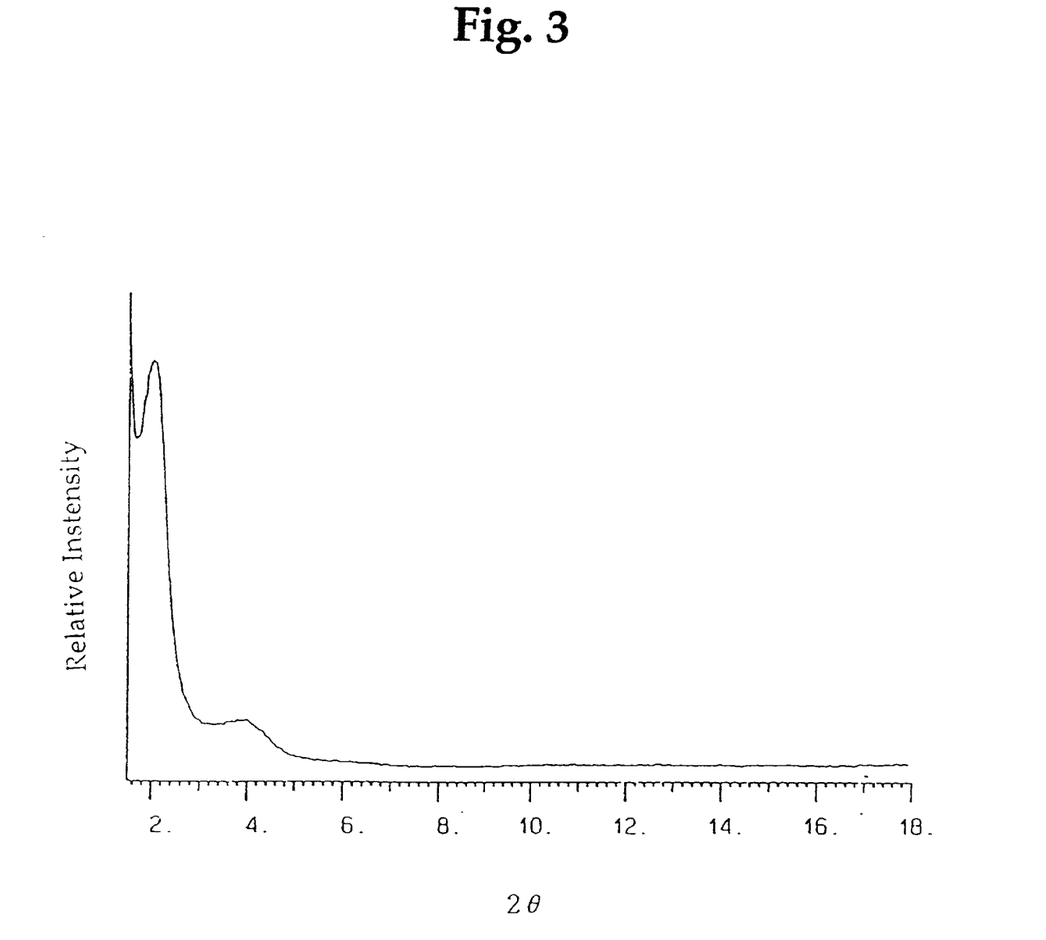
FIG. 3 is a X-ray diffraction pattern diagram of the final product of the present invention from Example 3.

The X-ray diffraction pattern of the calcined product of this invention is shown in FIG. 3 and was consistent with the characteristic peak of MCM-41.

The calcined product of this invention proved to have 43.0 Å d-spacing, a surface area of 1,000 m$^2$/g and pore size distribution of 36 Å.

EXAMPLE 4

Figure 4:
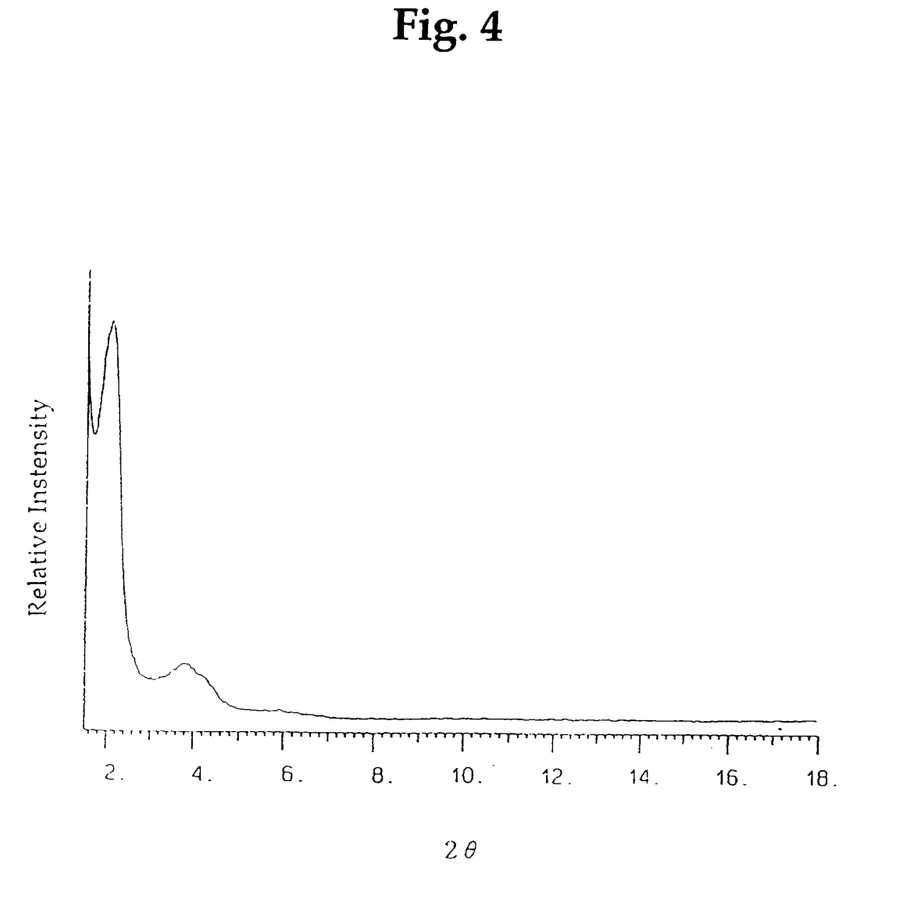
FIG. 4 is a X-ray diffraction pattern diagram of the final product of the present invention from Example 4.

Except using 0.47 g of $AlCl_3$ $6H_2O$ instead of $Al(NO_3)_3$ $9H_2O$, this example is identical with example 2, wherein the ratio of Si/Al was 40. X-ray diffraction pattern of the crystal obtained from example 4 is shown in FIG. 4 and was consistent with the characteristic peak of MCM-41. The calcined product of this example proved to have 43.0 Å d-spacing, a surface area of 980 m$^2$/g and pore size distribution of 36 Å.

EXAMPLE 5

Figure 5:
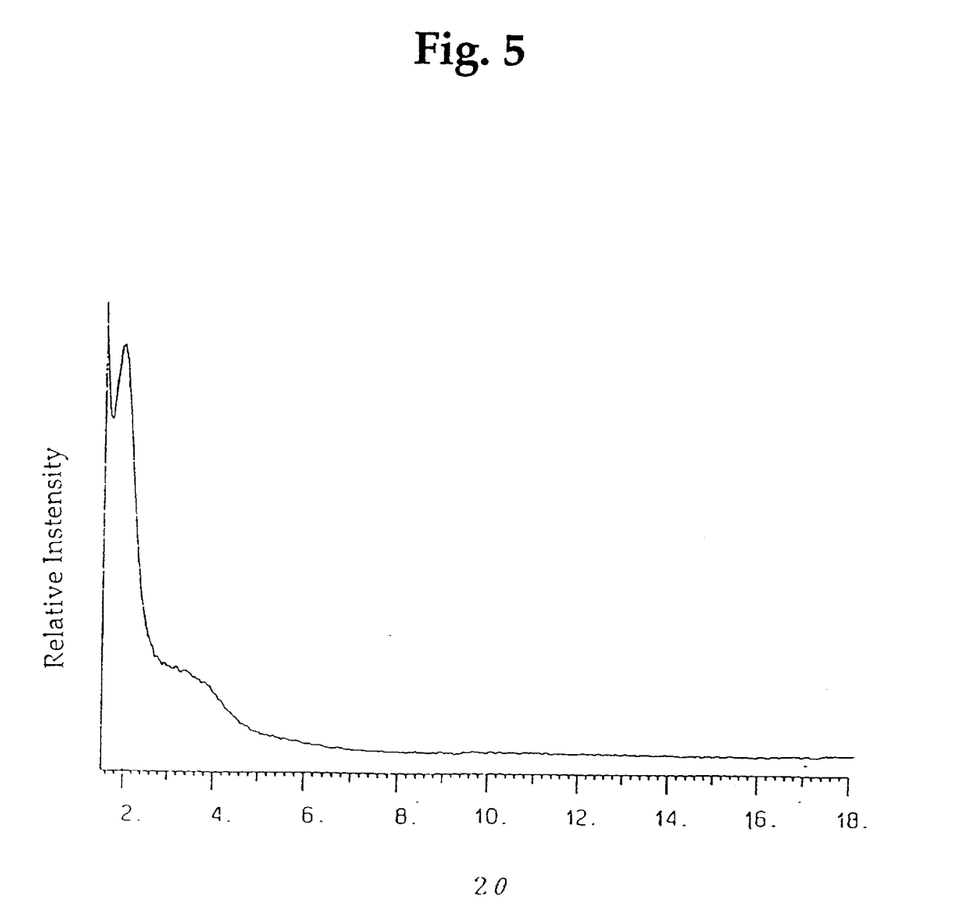
FIG. 5 is a X-ray diffraction pattern diagram of the final product of the present invention from Example 5.

Except using 0.1 g of $NaAlO_2$ instead of $Al(NO_3)_3$ $9H_2O$, this example is identical with the above example 2, wherein the ratio of Si/Al was 41. X-ray diffraction pattern of the crystal obtained from this example is shown in FIG. 5 and was consistent with the characteristic peak of MCM-41.

The calcined product of this example proved to have a 45.6 Å d-spacing, a surface area of 950 m$^2$/g and pore size distribution of 37 Å.

EXAMPLE 6

100 g of 24% hydrogen fluoride solution was loaded in polyethylene beaker and 3 g of silica was dissolved completely in the solution, and then dissolved uniformly by adding 0.38 g of titanium(IV) alkoxide in addition. The following experiment steps are carried out as those of the above example 1 with the same manner. The crystal obtained from this example showed structure having Si framework replaced by a portion of Ti wherein, the ratio of Si/Ti was 37.

Figure 6:
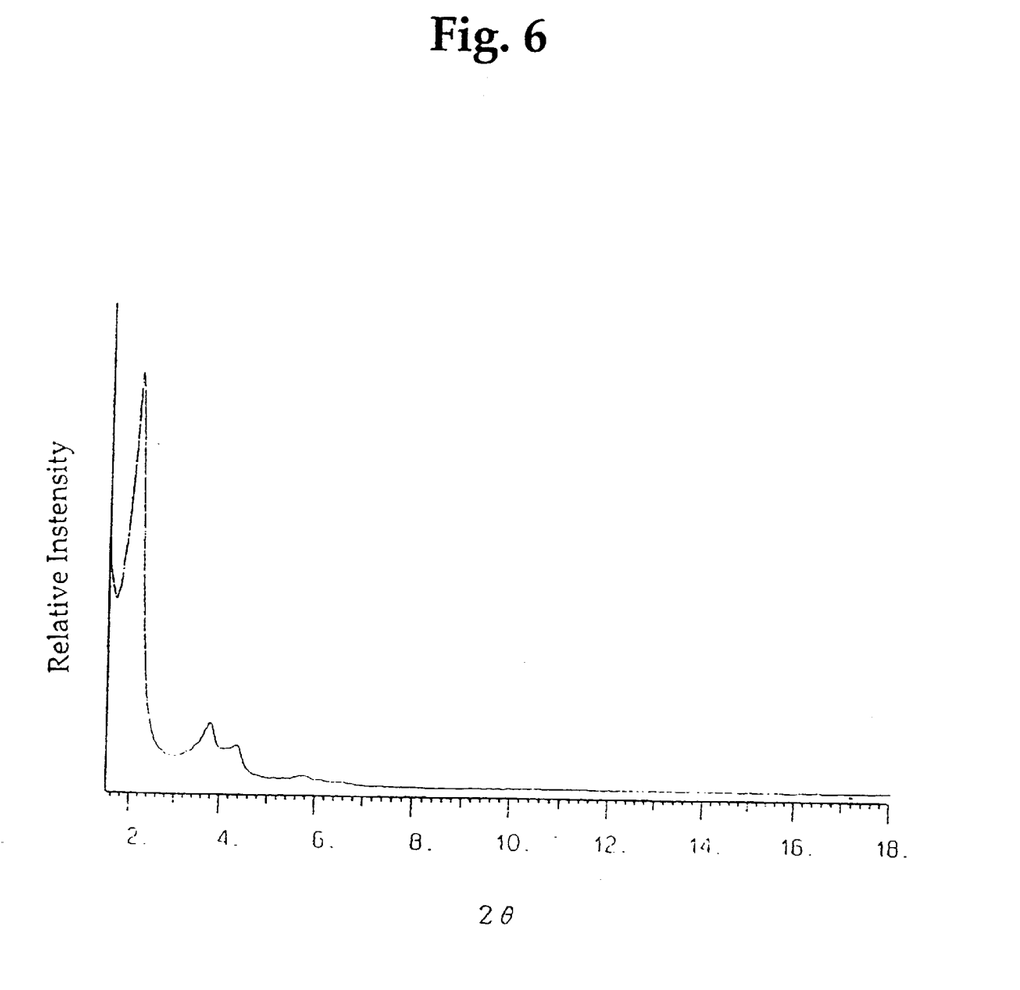
FIG. 6 is a X-ray diffraction pattern diagram of the final product of the present invention from Example 6.

And, X-ray diffraction pattern of the calcined product is shown in FIG. 6 and was consistent with the characteristic peak of MCM-41. The calcined product of this example proved to have 41.2 Å d-spacing, a surface area of 1000 m$^2$/g and pore size distribution of 35 Å.

What is claimed is:

1. A process for preparing a crystalline material having a mesoporous structure comprising:

(a) dissolving 2 to 10 parts by weight silica or silica in a mixture with metal salts and/or metal alkoxides in 100 parts by weight of 5 to 50% hydrogen fluoride solution, (b) adding the solution of step (a) to a solution of 2 to 10 parts by weight of a cationic surfactant and 20 to 30 parts by weight of concentrated ammonia solution in 100 parts by weight of distilled water to form a mixture, (c) aging said mixture of step (b) at a temperature of 25 to 80° C. for 2 to 3 hours to form a product, and (d) calcining said product of step (c) at a temperature of 500 to 800° C. for 4 to 6 hours to form said mesoporous material.

2. The process of claim 1, wherein said metal salts are selected form the group consisting of $Al(NO_3)_3$, $Al(SO_4)_3$, $AlCl_3$, and $NaAlO_2$.

3. The process of claim 1, wherein said metal alkoxide is selected form the group consisting of titanium (IV) alkoxide, aluminum alkoxide and silicon alkoxide.

4. The process of claim 1, wherein said cationic surfactant is cetyltrimethylammonium bromide or cetyltrimetylammonium chloride.

5. The process of claim 1, wherein said crystalline material having a mesoporous structure prepared by said process has a molar ratio of Si/Ti or Si/Al of more than 10.

* * * * *

UNITED STATES PATENT AND TRADEMARK OFFICE
CERTIFICATE OF CORRECTION

PATENT NO.    : 6,096,287
DATED         : August 1, 2000
INVENTOR(S)   : Lee et al.

It is certified that error appears in the above-identified patent and that said Letters Patent is hereby corrected as shown below:

Column 6,
Line 47, "selected form" should read -- selected from --.
Line 50, "selected form" should read -- selected from --.
Lines 53-54, "cetyltrimetylammonium" should read -- cetyltrimethylammonium --.

Signed and Sealed this

Twenty-sixth Day of November, 2002

*Attest:*

*Attesting Officer*

JAMES E. ROGAN
*Director of the United States Patent and Trademark Office*